Oct. 8, 1946.   J. M. BENSON   2,409,098
FISHING ROD AND REEL ASSEMBLY
Filed April 6, 1945

INVENTOR
JOHN M. BENSON
BY
Wheeler, Wheeler & Wheeler
ATTORNEYS

Patented Oct. 8, 1946

2,409,098

UNITED STATES PATENT OFFICE 2,409,098

FISHING ROD AND REEL ASSEMBLY

John M. Benson, Milwaukee, Wis.

Application April 6, 1945, Serial No. 586,933

8 Claims. (Cl. 43—20)

My invention relates to improvements in fishing rod and reel assemblies.

The object of my invention is to provide a casting rod with an improved reel and associated reel winding and braking mechanism.

More specifically my objects are to provide an open reel of large diameter with winding wings struck up from a single disk of sheet metal with the wings adapted to serve the triple purpose of guiding the line, controlling the rate of reel rotation and assisting in driving water from the line during the winding operation; to provide a reel having a pitch in the direction of the rod substantially at the point of the first guiding eyelet or loop; to provide a reel with winding handles adjustable to the requirements of right and left handed users; to provide conveniently operable brake means for controlling the operation of the reel and, in general, to provide an improved casting assembly having maximum casting range.

In the drawing.

The parts are identified by the same reference characters throughout the several views.

Figure 1:
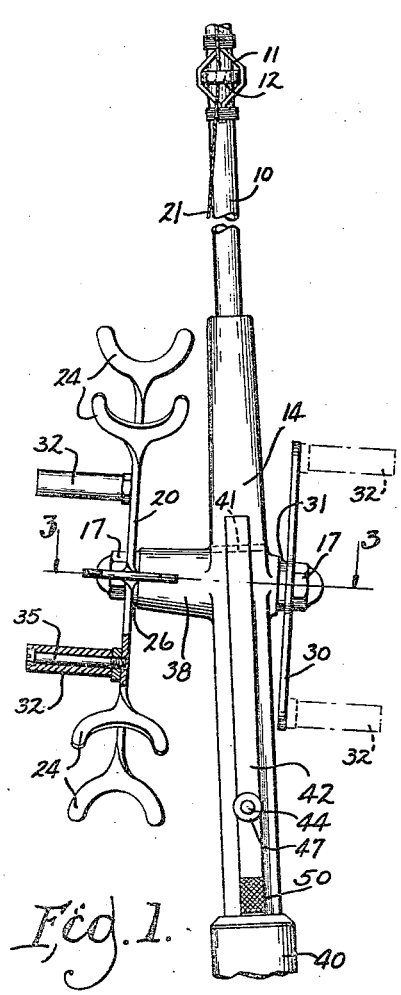
Fig. 1 is an elevation of my improved rod and reel assembly with outer end portions of the rod broken away.
Figure 2:
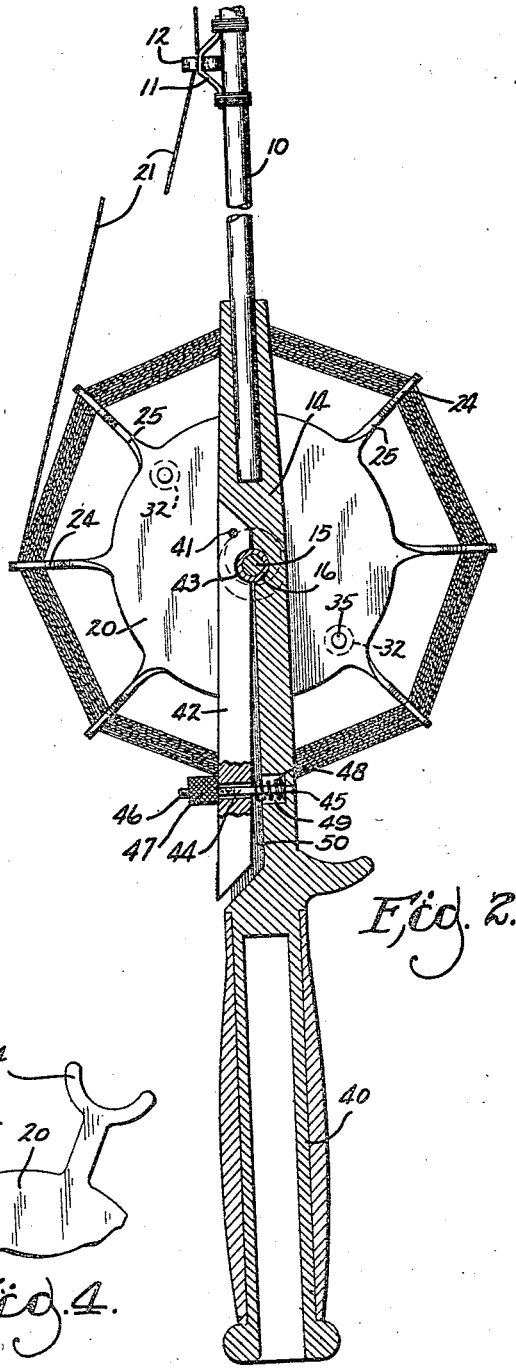
Fig. 2 is a view taken at right angles to Fig. 1 and showing the handle portion in section.
Figure 3:
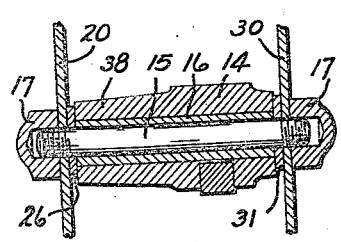
Fig. 3 is a detailed sectional view of the reel shaft and associated parts.
Figure 4:
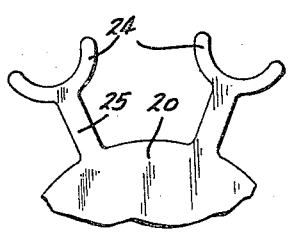
Fig. 4 is a fragmentary view of the blank from which the reel is formed as it appears after the initial stamping operation, whereby a disk of sheet metal is cut away leaving winding arms to be twisted to winding position in a second operation.

The rod portion 10 of my improved assembly may be of ordinary construction provided with brackets 11 which support the line-guiding eyelets 12. This rod is connected in any suitable manner with the reel supporting portion 14 in which the winding shaft 15, encased by a spacing sleeve 16, is journaled. The sleeve 16 is rigidly secured to the winding shaft 15 by clamping nuts 17 fitted to the respective ends of the shaft as best shown in Fig. 3. The shaft is obliquely mounted in the reel supporting portion as best indicated in Fig. 1, whereby the reel disk 20 is given a pitch toward the illustrated eyelet 12 on the rod 10 and the line 21 drawn from the eyelet to the reel in the plane in which the reel revolves, thus avoiding any tendency for the line to draw sideways away from the reel. The winding arms or wings 24 are struck up from a disk of sheet metal considerably larger than the disk 20, as indicated in Fig. 4. After cutting away the surplus metal, the wings are twisted from the position in which they are shown in Fig. 4 to the position in which they are shown in Fig. 1 in which the wings extend transversely to the plane of the disk 20. The twisted wing supporting arms 25 and the wings 24 serve as air circulators during rotation of the reel, the wings being adapted to serve as fans. The disk 20 is centrally perforated to receive the shaft 15 and this disk, together with a washer 26, is interposed between the nut 17 and the adjacent end of the sleeve 18. At the other end of the shaft 15, a strip of metal 30 and washer 31 are similarly clamped to the other end of the spacing sleeve 16 by their associated nut 17 whereby the shaft, the metal member 30 and the reel disk 20 may revolve as a unit.

Winding arms 32 are secured to the disk 20 by threaded studs 35 screwed into suitable apertures in the disk whereby these winding arms 32 may be removed and transferred to the metal strip 30 as indicated by dotted lines in Fig. 1 to suit the requirements of a person who desires to wind the reel with his right hand while holding the rod in the left hand.

It will be observed that the reel supporting portion 14 of the rod is provided with a hub 38 which spaces the reel from the rod sufficiently to allow it to be mounted with an oblique pitch toward the outer end of the rod as above explained. This hub also provides an elongated bearing for the rotary sleeve 16.

Between the handle 40 and a transverse shaft 41 in the reel supporting portion 14, said portion is channeled to receive a brake lever 42, one end of which is fulcrumed on a pin 41 with an adjacent portion arcuately contoured at 43 to fit the sleeve 16. Near the handle the brake lever 42 is apertured to receive a connecting bolt or pin 44 having its head 45 countersunk in the member 14 and its threaded end 46 provided with a nut 47 which may be adjusted to regulate the outward movement of this end of the lever 42 which is urged outwardly by a coiled compression spring 48 mounted in the socket 49 in the member 14 at the base of the channel 50 in which lever 42 is mounted.

The brake lever 42 is located on the side of the reel supporting member 14 which is normally uppermost as the reel is held by the user whereby the brake lever may be operated by the thumb of the person grasping the handle 40. When the lever is pressed inwardly in the channel 50, the braking pressure may be applied to the sleeve 16 and rotation of the reel thereby controlled.

My improved reel is preferably nearly six inches in diameter and therefore only about one hundred turns are required to wind up a one hundred and fifty foot line. Owing to this large diameter, the winding wings 24 provide considerable air circulation even when manually rewinding the reel. Inasmuch as the line is supported at a distance from the disk 20 with only a few coils superposed even when the line is fully wound on the reel, the line may be dried quickly, all surplus water being driven from the line by the fan wings during the winding operation. The large radius of the reel minimizes the resistance to rotation during casting operations and this more than offsets the air resistance to the movement of the fan wings whereby casting is possible at greater distance than with ordinary reels.

Owing to the fact that the reel is of large diameter and of light weight, the line travels at approximately uniform speed from the beginning to the end of the casting operation, and there is but little overrun when the lure strikes the water due to the light weight and the operation of the arcuate fan-shaped winding bars or arms. Also, the brake may be applied, if desired, to prevent any overrun whatever when the lure strikes the water.

I claim:

1. A fishing rod and reel assembly comprising the combination with a casting rod, of a transverse reel supporting shaft obliquely mounted in the rod, and an open reel disk fixedly secured to the shaft at one end and provided with transversely disposed arcuate line-gathering wings, radially spaced from the disk, a brake lever pivoted to the rod in bearing relation to said shaft, and a spring interposed between the actuating arm of the brake lever and the rod in a position to normally urge the lever out of bearing contact with the shaft.

2. In a fishing rod and reel assembly, a reel supporting shaft rotatably mounted in a reel supporting portion of the rod, and a brake lever pivotally connected with the rod, and having a portion in bearing relation to said shaft, and normally held out of bearing contact therewith.

3. In a fishing rod and reel assembly, a rod having a reel supporting portion provided with a longitudinally extending channel, a brake lever pivotally connected with said reel supporting portion at one end of said channel, a reel supporting shaft extending across the base of the channel in a position to be frictionally contacted by said lever, and a spring normally urging said lever out of frictional contact with the shaft.

4. In a fishing rod and reel assembly, the combination with a fishing rod having a rotary shaft mounted therein near its handle end, a reel disk fixedly secured to one end of the shaft, a winding arm comprising a strip of metal fixedly secured to the other end of the shaft in a plane parallel to the reel disk, and a winding handle detachably connectible with either the disk or said strip of metal whereby to suit the convenience of right and left-handed users.

5. A fishing rod having a reel supporting portion provided with a laterally projecting oblique hub, a shaft extending through the hub along the axis thereof, a spacing sleeve mounted on the shaft to rotate therewith, a reel disk clamped to one end of the spacing sleeve, a winding arm clamped to the other end of the sleeve, and a winding handle detachably connectible with either the winding arm or the reel disk.

6. A fishing rod and reel assembly comprising the combination of a rod having a handle provided with a longitudinally channelled reel supporting portion, a transverse shaft revolubly mounted across the base of the channel near one end thereof, a brake bar having one end portion pivotally fulcrumed in the channel beyond the shaft and the other end extending toward the handle end of the rod, and a compression spring socketed in the base of the channel, with one end in pressure relation to the bar to urge it normally out of friction bearing contact with the shaft.

7. The combination with the handle end portion of a fishing rod, of a lever pivotally connected therewith and provided with an actuating arm extending toward the handle end of the rod, a spring mounted on the rod in a position to urge said arm laterally therefrom, and a rotary reel supporting member mounted on the rod in a position to be engaged by the lever when the latter is actuated in opposition to the urge of said spring.

8. The combination with the handle end portion of a fishing rod, of a rotary reel supporting member mounted thereon and exposed at one side thereof, and a spring retracted brake mounted on the rod and movable into and out of contact with the exposed portion of said member, said brake having an actuating arm extending in the direction of the handle end of the rod.

JOHN M. BENSON.